(12) United States Patent
Yee et al.

(10) Patent No.: US 6,353,830 B1
(45) Date of Patent: Mar. 5, 2002

(54) GRAPHICAL INTERFACE FOR OBJECT-RELATIONAL QUERY BUILDER

(75) Inventors: David R. Yee, Pacifica; David Brennan Gaunce, Mountain View, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/505,492

(22) Filed: Feb. 16, 2000

Related U.S. Application Data

(63) Continuation of application No. 09/087,122, filed on May 29, 1998, now Pat. No. 6,119,126.

(51) Int. Cl.[7] .............................................. G06F 17/00
(52) U.S. Cl. ........................ 707/102; 707/101; 707/103
(58) Field of Search ....................... 707/1–10, 101–104, 707/514–522; 207/1–206, 514–540

(56) References Cited

U.S. PATENT DOCUMENTS

| | | | | |
|---|---|---|---|---|
| 4,974,194 A | * | 11/1990 | Barker et al. ................ | 707/540 |
| 5,850,544 A | * | 12/1998 | Parvathaneny et al. ......... | 707/4 |
| 5,893,108 A | * | 4/1999 | Srinavasan et al. .......... | 707/103 |
| 5,956,730 A | * | 9/1999 | Burrroughs et al. ......... | 707/102 |
| 5,970,490 A | * | 10/1999 | Morgenstern ................. | 707/10 |
| 6,016,497 A | * | 1/2000 | Suver ........................... | 707/101 |
| 6,085,031 A | * | 7/2000 | Johnson et al. .............. | 707/514 |
| 6,122,627 A | * | 9/2000 | Carey et al. ................... | 707/4 |

\* cited by examiner

Primary Examiner—Thomas Black
Assistant Examiner—David Jung
(74) Attorney, Agent, or Firm—Park, Vaughan & Fleming LLP

(57) ABSTRACT

One embodiment of the present invention provides a method for constructing a query for an object-relational database. This method displays at least part of a schema for the object-relational database to a user in a graphical representation. Next, the method allows the user to perform graphical manipulations on the schema. The method then generates a query based upon the schema and the graphical manipulations, and this query is sent to the object-relational database. Another embodiment of the present invention provides a method for processing an object-relational query for transmission from a client to an object-relational database server. This method receives the query at the client, and parses the query to determine which object-relational structures the query is attempting to access. The method then determines from data dictionary information, loaded from the object-relational database server and cached locally on the client, if the object-relational structures the query is attempting to access exist in the object-relational database server. If they do not exist, the method indicates an error condition. Yet another embodiment of the present invention provides a method for displaying objects defined within an object-oriented programming system that are stored in a relational table structure. This method displays a table of objects, so that a first object in the table is represented by an identifier. The method next receives a command from a user to provide a more-detailed display of the first object. In response to this command, the method retrieves attributes of the first object from a data store, and displays an expanded representation of the first object by displaying the attributes.

9 Claims, 5 Drawing Sheets

GRAPHICAL INTERFACE FOR OBJECT-RELATIONAL QUERY BUILDER

RELATED APPLICATION

This application is a continuation of of U.S. patent application Ser. No. 09/087,122 filed on May 29, 1998 now U.S. Pat. No. 6,119,126.

BACKGROUND

1. Field of the Invention

The present invention relates to relational database systems, and more particularly to a relational database system that facilitates persistent storage of "objects" from an object-oriented programming system within a tabular-relational framework. The present invention additionally provides a graphical user interface for viewing and performing operations on object-relational data.

2. Related Art

As object-oriented programming systems are increasingly used by computer programmers, numerous software tools and systems have been adapted to handle objects and their related methods. However, existing relational database systems are not designed to accommodate and manipulate objects, which are typically composed of attributes, some of which may reference other objects. For example, a conventional relational database system stores data in tables which comprise rows and columns of entries containing scalar values. At present, it is not possible to store objects in these tables because the entries in these tables are not designed to accommodate objects.

Additionally, a number of graphical tools are presently used to manipulate and view database structures such as tables. However, existing tools are not designed to manipulate and view database structures that store objects. Existing tools only allow a user to view and manipulate scalar values stored in tables; they do not allow the constituent attributes of an object to be viewed and manipulated, nor do they allow objects referenced within other objects to be retrieved for viewing and manipulation.

Hence, what is needed is a database system that facilitates persistent storage of objects. Additionally, what is needed are database tools that allow objects stored within a database system to be easily viewed and manipulated.

Another issue in viewing stored objects in a database system is the fact that many database systems are designed to work within a client-server distributed system. Typically, a client computer system accesses information contained in a database on a server computer system. In order to achieve a reasonable level of performance in such a system, it is desirable to minimize the number of communications that take place between client and server computer systems across the communication network. These communications are typically time-consuming and can potentially clog up the communication network. To this end, some existing distributed database systems attempt to minimize the number of communications that take place by first examining a query on the client to ensure the query properly references existing database structures on the server before sending the query to the server. If the query does not properly reference existing database structures on the server, the query is not sent to the server. Instead, a user on the client computer system is asked to correct the query or enter a new query. In this way, unnecessary communications from client to server computer systems are avoided. However, these distributed database systems are not designed to accommodate objects. In particular, these distributed database systems are not designed to determine whether a query properly references object data stored on the server.

Hence, what is needed is a distributed database system that can determine whether a query properly references object data stored in database structures on a server before the query is sent to the server.

SUMMARY

One embodiment of the present invention provides a method for constructing a query for an object-relational database. This method displays at least part of a schema for the object-relational database to a user in a graphical representation. Next, the method allows the user to perform graphical manipulations on the schema. The method then generates a query based upon the schema and the graphical manipulations, and this query is sent to the object-relational database.

Another embodiment of the present invention provides a method for processing an object-relational query for transmission from a client to an object-relational database server. This method receives the query at the client, and parses the query to determine which object-relational structures the query is attempting to access. The method then determines from data dictionary information loaded from the object-relational database server and cached locally on the client, if the object-relational structures the query is attempting to access exist in the object-relational database server. If not, the method indicates an error condition.

In a variation on this embodiment, if the object-relational structures exist on the object-relational database server, the method sends the query to the object-relational database server. In another variation, if the object-relational structures exist on the object-relational database server, the method displays the query to a user, and if a command is received from the user to send the query, the client sends the query to the object-relational database server.

Yet another variation includes displaying the query to a user at the client computing system, and allowing the user to modify the query through manipulations of graphical objects representing the query. These modifications may include adding new tables to the query, selecting different columns for the query, and modifying conditions of the query.

Yet another embodiment of the present invention provides a method for displaying objects defined within an object-oriented programming system that are stored in a relational table structure. This method displays a table of objects so that a first object in the table is represented by an identifier. The method next receives a command from a user to provide a more-detailed display of the first object. In response to this command, the method retrieves attributes of the first object from a data store, and displays an expanded representation of the first object by displaying the attributes.

In a variation on this embodiment, displaying the expanded representation of the first object includes displaying an expanded representation of the entire first table.

Another variation includes receiving a command from the user to provide a more-detailed display of an attribute of the first object. If this attribute represents a second object, the method retrieves attributes of the second object from the data store, and displays an expanded representation of the second object by displaying the attributes of the second object.

In another variation, retrieving the attributes of the first object from the data store includes retrieving the attributes of the first object from an object table. This object table contains a collection of objects that can be referenced from other tables.

DEFINITIONS

Object-relational database—a database including objects defined within an object-oriented programming system that are stored in a relational table structure.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein. For example, many of the components and operations described below can be implemented using computer hardware, or alternatively, using computer software.

Description of Database System

Figure 1:
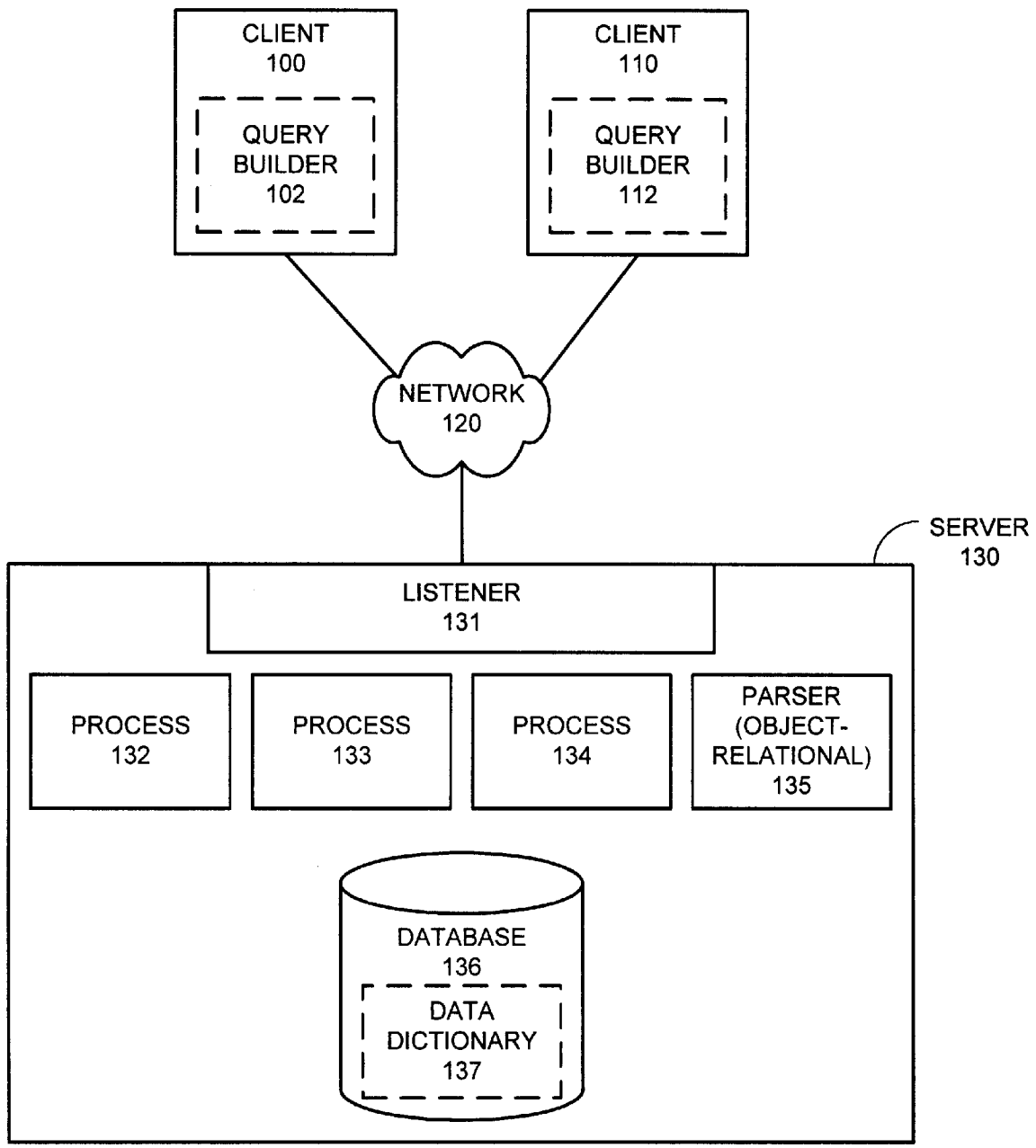
FIG. 1 illustrates the structure of a distributed database system in accordance with an embodiment of the present invention.

FIG. 1 illustrates the structure of a distributed database system in accordance with an embodiment of the present invention. This system includes clients 100 and 110, and server 130, which are coupled together through a network 120. Clients 100 and 110 can be any type of node on a computer network with computational capability and including a mechanism for communicating across network 120. This includes, but is not limited to personal computers and workstations. Server 130 can be any node on a computer network including computational capability and data storage capability as well as a mechanism for servicing client requests for computational or data storage resources. Network 120 may be any communication channel through which computer systems can communicate. This includes, but is not limited to, local area networks, such as an Ethernet or Token ring, and wide area networks, such as the Internet.

Clients 100 and 110 include query builders 102 and 112, respectively. Query builders 102 and 112 are computational resources that allow users of clients 100 and 110 to form and/or manipulate queries to be sent over network 120 to server 130. Many of the features of the present invention reside within query builders 102 and 112.

Server 130 includes listener 131, which is a process that listens on network 120 for requests from clients 100 and 110 to server 130. Server 130 additionally includes processes 132, 133 and 134, which receive and process queries from clients 100 and 110. In one embodiment, these queries are in the form of SQL commands. Processes 132, 133 and 134 use parser 135 to parse queries from clients 100 and 110 before applying the queries to database 136. In the illustrated embodiment, parser 135 includes resources to parse queries with object-relational expressions.

Database 136 may be any type of system that facilitates persistent storage of data. This includes, but is not limited to, relational database systems and hierarchical database systems. Database 136 includes data dictionary 137, which includes information about what data exists within database 136 and how this data is stored. More particularly, in one embodiment, data dictionary 137 includes schema information describing the structure of data stored within database 136.

The system illustrated in FIG. 1 operates as follows. A user of client 100 forms a query by manipulating query builder 102. Query builder 102 allows the user to form and graphically manipulate the query until the user decides to send the query to server 130 across network 120. At server 130, listener 131 receives the query and passes it to a process, such as process 132. Process 132 parses the query using parser 135, and this parsed query is applied to database 136. In one embodiment of the present invention, a representation of the parsed query is compared against information from data dictionary 137 acquired from database 136 to verify that the query is accessing a valid structure within database 136 before the query is applied to database 136. Finally, after the query is processed, data values can be returned through network 120 to client 100 so that the user can view the results of the query.

Description of Client Software Architecture

Figure 2:
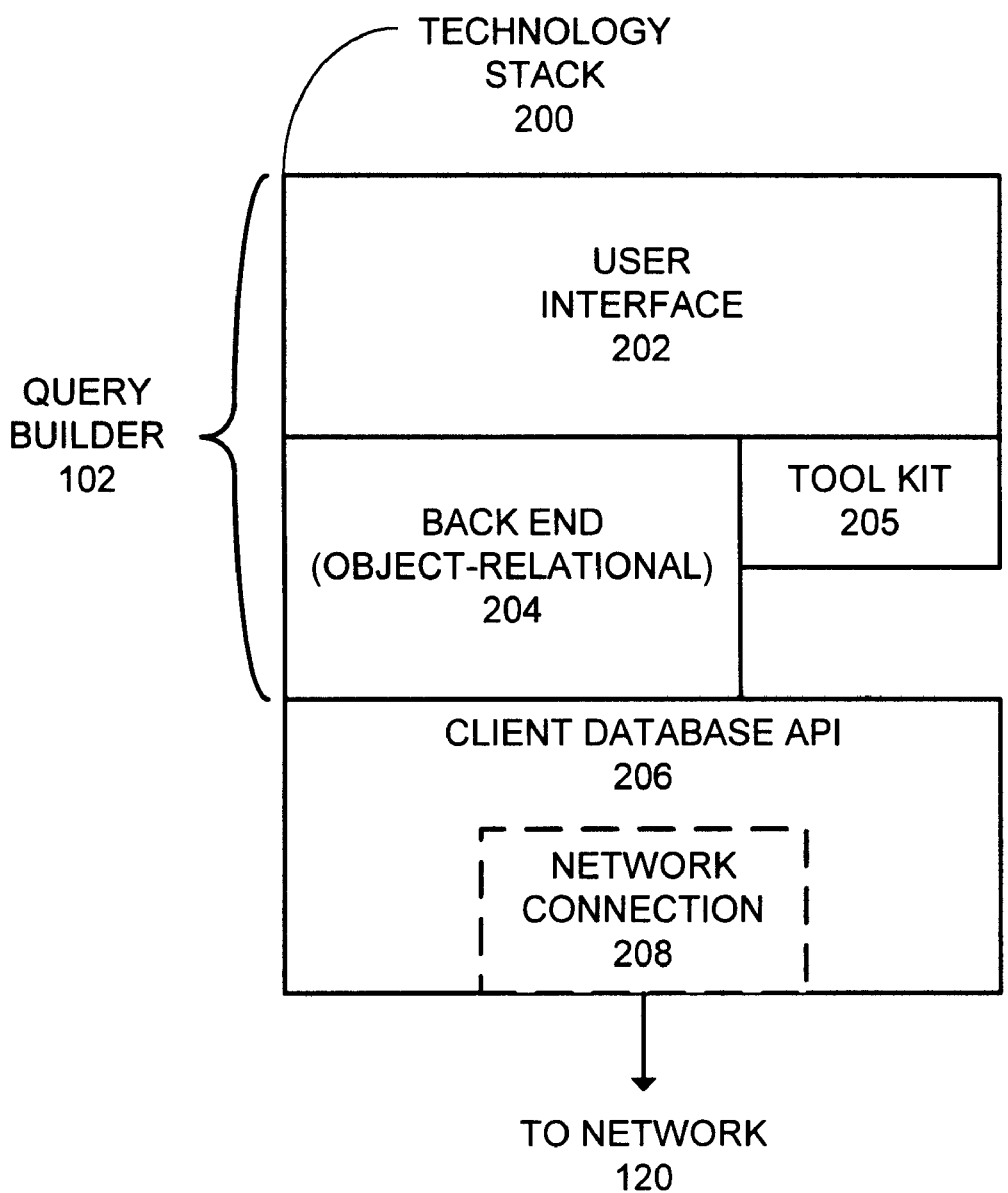
FIG. 2 illustrates the internal structure of client 100 from FIG. 1 in accordance with an embodiment of the present invention.

FIG. 2 illustrates the internal structure of client 100 from FIG. 1 in accordance with an embodiment of the present invention. Client 100 includes technology stack 200, which includes various layers used to implement a client of a database system. Technology stack 200 primarily includes query builder 102 and client database access programmatic interfaces (client database API) 206.

As illustrated in FIG. 2, query builder 102 includes user interface 202, which is coupled to backend 204. User interface 202 manages the presentation of queries and database structures to a user of client 100. In one embodiment, user interface 202 includes a graphical user interface, which allows a user of the client to graphically view and manipulate queries and data for database 136 from FIG. 1. User interface 202 additionally calls functions from toolkit 205 to manipulate and display objects and other database structures to the user. Toolkit 205 generally includes portable functions to manipulate and display objects on client 100. Backend 204 manages the internal representation of queries and the database schema and is described in more detail below with reference to FIG. 3.

Client database API 206 exists below query builder 102. It includes support files and other resources for communication with database 136 on server 130. Client database API 206 includes network connection 208, which facilitates communications for queries sent across network 120 to server 130.

Description of Back End

Figure 3:
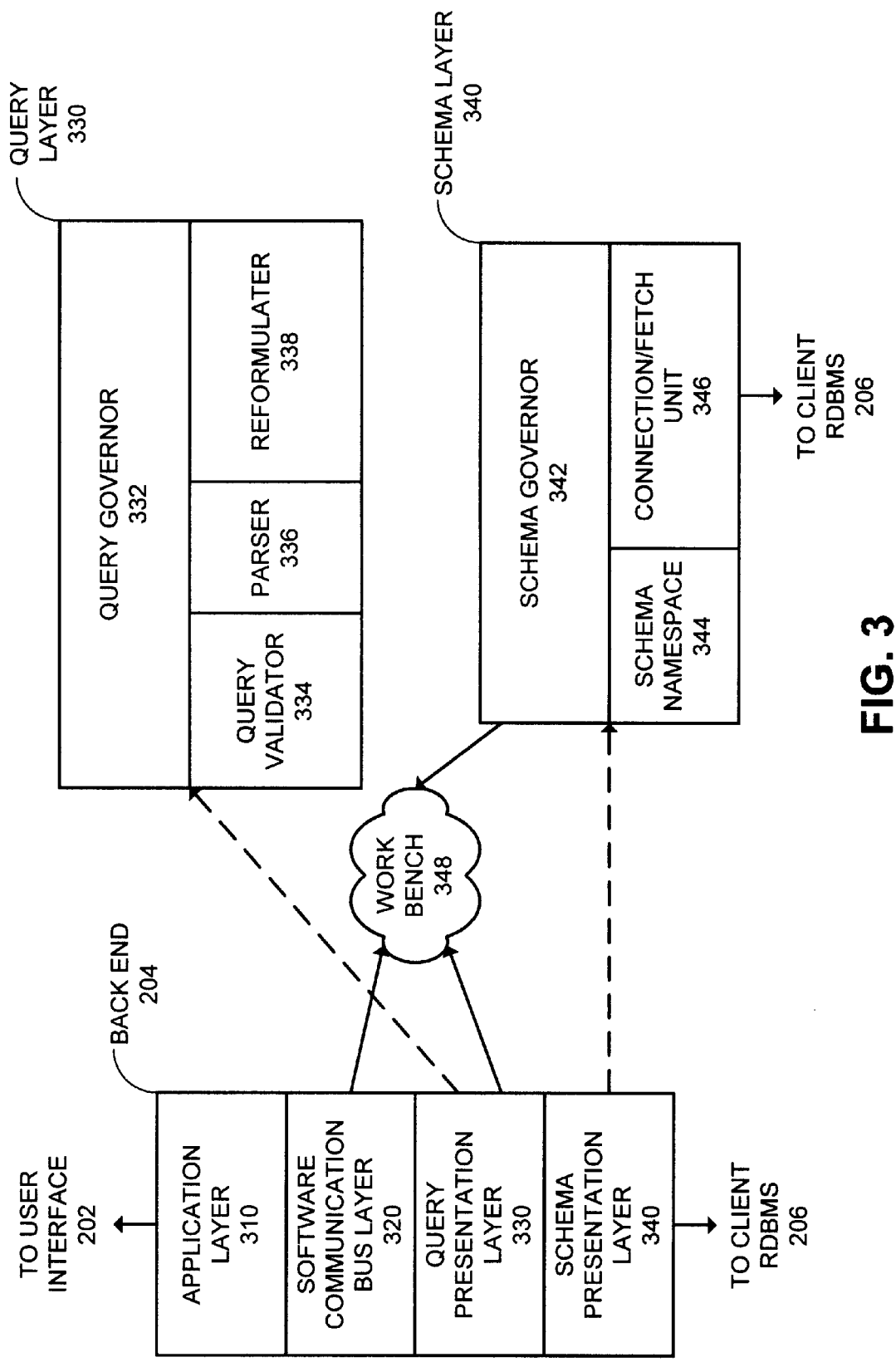
FIG. 3 illustrates the internal structure of backend 204 from FIG. 2 in accordance with an embodiment of the present invention.

FIG. 3 illustrates the internal structure of backend 204 from FIG. 2 in accordance with an embodiment of the present invention. Backend 204 includes application layer 310, software communication bus layer 320, query representation layer 330 and schema representation layer 340. Application layer 310 communicates with user interface 202 and manages one or more documents on a display. This involves managing and manipulating data that represents what is being presented on the display.

Below application layer 310 is software communication bus layer 320, which manages communication between user interface 202 and backend 204. More specifically, software communication bus layer 320 manages caching and other communication details that user interface 202 does not need to know about. Software communication bus layer 320 provides message-based abstraction to clearly separate application layer 310 from query representation layer 330.

Software communication bus layer 320 sits above query representation layer 330. Query representation layer 330 keeps track of information related to queries. This includes information about what data sources are represented in a query, what fields are displayed, what conditions are used to restrict result sets and how fields are ordered. Query representation layer 330 also knows about data types. In a conventional database system, data types are scalar values. However, in an object-relational database system the types can be objects. Query representation layer 330 sits above schema representation layer 340. Schema representation layer 340 keeps track of information related to the database schema.

Query representation layer 330 includes query governor 332 query validator 334, parser 336 and reformulator 338. As illustrated, query governor 332 sits on top of and controls the operations of query validator 224, parser 336 and reformulator 338. Query governor 332 manages a parsed representation of a query and some persistent display characteristics. Query governor 332 additionally manages methods for manipulating parsed representations including constructing (parsing), reformulation into object-oriented SQL text and validation. Query validator 324 manages a lower-level representation of the query and understands the interface to schema representation layer 340. Parser 336 understands how to parse a query into lexical elements. (In one embodiment, it also understands how to reconstruct a query out of lexical elements.) Reformulator 338 can rebuild SQL statements from an internal representation of a query.

Schema representation layer 340 includes schema governor 342, schema namespace 344 and connection/fetch unit 346. As illustrated, schema governor 342 sits on top of and controls the operations of schema namespace 344 and connection/fetch unit 346. Schema governor 342 maintains cached client-side representations of a Relational Database Management System's (RDBMS's) data dictionary information, and provides methods for acquiring information from the cache so that query representation layer 330 does not need to know how to interface with client database API 206. Schema governor 342 knows how tables are related to each other. It knows what fields are associated with each table. It knows about object types as well as relational information. Query validator 334, parser 336 and reformulator 338 communicate with schema governor 342 to retrieve database schema information.

Schema namespace 344 stores field and type information in an access structure. In one embodiment, this access structure is a hash table that facilitates rapid retrieval of the field and type information, as well as information about data accessing privileges.

Connection/fetch unit 346 handles connections to a database system as well as fetches from the database system. In the illustrated embodiment, connection/fetch unit 346 communicates with client database API 206 from FIG.

As illustrated in FIG. 2, software communication bus layer 320, query representation layer 330 and schema representation layer 340 utilize workbench 348. Workbench 348 includes general programming utilities. For example, workbench 348 may include utilities to implement list and hash tables and utilities to manage memory.

Description of Query Manipulation

Figure 4:
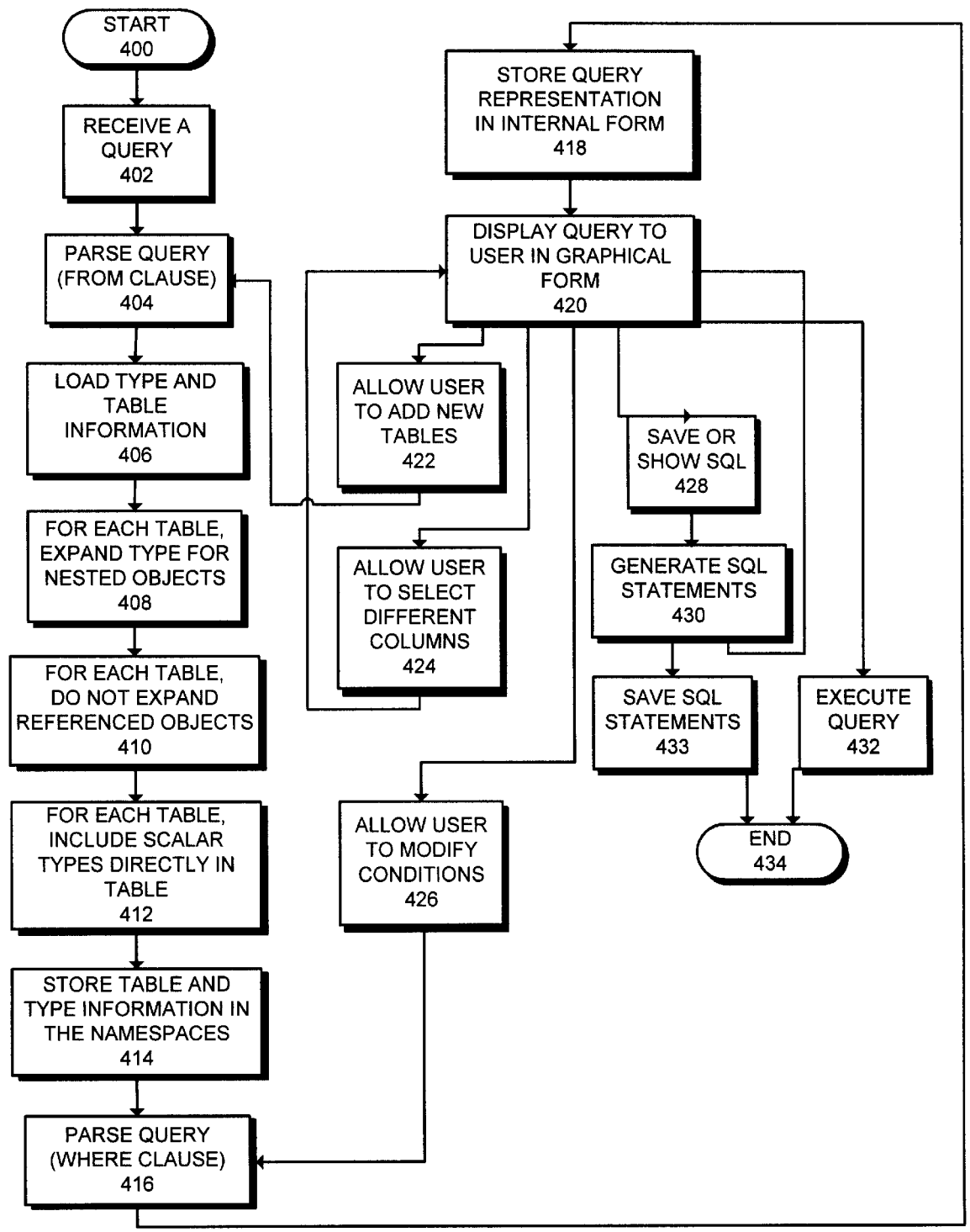
FIG. 4 is a flow chart illustrating operations related to processing a query in accordance with an embodiment of the present invention.

FIG. 4 is a flow chart illustrating operations related to processing a query in accordance with an embodiment of the present invention. The system starts in state 400 and proceeds to state 402. In state 402, the system receives a query. The query can be received from a number of sources. In one embodiment, a user may type in a query, the user may paste in a query from a clipboard or the query may be retrieved from a file. Next, the system proceeds to state 404. In state 404, parser 336 (from FIG. 3) begins to parse the query. More specifically, the parser 336 operates on the "from" clause of the query. The system next proceeds to state 406. In state 406, the schema governor 342 (from FIG. 3) loads type and table information for the types and tables implicated by the query. In one embodiment, this information is retrieved from database 136 on server 130 (from FIG. 1) and is cached locally on client 100. This reduces unnecessary communications across network 120 to retrieve schema information.

The system next proceeds to states 408, 410 and 412. In these three states, schema governor 342 (from FIG. 3) handles three different types of table entries; state 408 handles nested objects; state 410 handles referenced objects; and state 412 handles scalar values. Nested objects are objects whose attributes are stored directly in a table structure. Referenced objects are objects stored in an object table that are "referenced" by a pointer, or some other type of index, from another location inside of another object or inside of a relational table. Scalar values are simply conventional data values (such as integers or characters) that are stored in table structures. In state 408, the system expands nested objects into their constituent attributes. In contrast, in state 410 referenced objects are not expanded. This is because referenced objects may refer to other objects in such a way as to create a recursive structure that may be impossible to fully expand. In state 412, conventional scalar types are directly included in tables. The system next proceeds to state 414.

In state 414, the system stores table and type information in schema namespace 344 (from FIG. 3). The system next proceeds to state 416. In state 416, query representation layer 330 begins to parse the "where" clause and the "select" clause to determine columns referenced by the query. It does so in order to validate the SQL query being parsed. This validation ensures that the query will validly access an existing data storage structure within database 136. This validation on the client side of the database system prevents unnecessary communications across network 120 for invalid queries. The system next proceeds to state 418. In state 418, the system stores a representation of the query in an internal form. The system next proceeds to state 420. In state 420, the system displays the resulting query to a user of client 100. This display process involves software communication bus layer 320 and application layer 310 as well as user interface 202. From state 420, the system can proceed to any of states 422, 424, 426, 428 and 432 under user control.

States 422, 424 and 426 allow a user to modify the query by graphically manipulating a representation of the query on a graphical display. These operations are controlled by user interface 202 and application layer 310. (Note that these operations are representative, but not exclusive.) In state 422, the system allows the user to add new tables to the query. The system next returns to state 404 because the data source (or from clause) needs to be reparsed. In state 424, the system allows the user to select different columns. Another operation (not shown) allows a user to enter formulaic expressions that are treated like columns. For example, "base salary+100," or simply a number, such as "100." The system next returns to state 420 to display the resulting query with the different columns selected. In state 426, the system allows the user to modify conditions (or the "where" clause) of the query. The system then returns to state 416 to reparse the "where" clause.

Alternatively, from state 420 the user can command the system to proceed to state 428. In state 428, the system starts the process of saving or showing the resulting SQL statements that are generated from the graphical representation. In order to do so, the system proceeds to state 430 in which reformulator 338 (from FIG. 3) generates SQL statements from the internal representation of the query. From state 430, the system next either proceeds to state 433 or state 420. In state 433, the system saves the SQL statements (possibly to a file) before proceeding to end state 434. In state 420 the system displays the resulting query the user. However, note, that in this case, the query is displayed as SQL statements, not in a graphical representation.

From state 420, the system may also proceed to state 432 in which the query is sent across network 120 to server 130 to be processed. The decision to send the query can be made automatically by the system, or alternatively, can be made by the user who commands the system to send the query. The system next proceeds to state 434, which is an end state.

Description of Graphical Representation of Object Relational Tables

Figure 5:
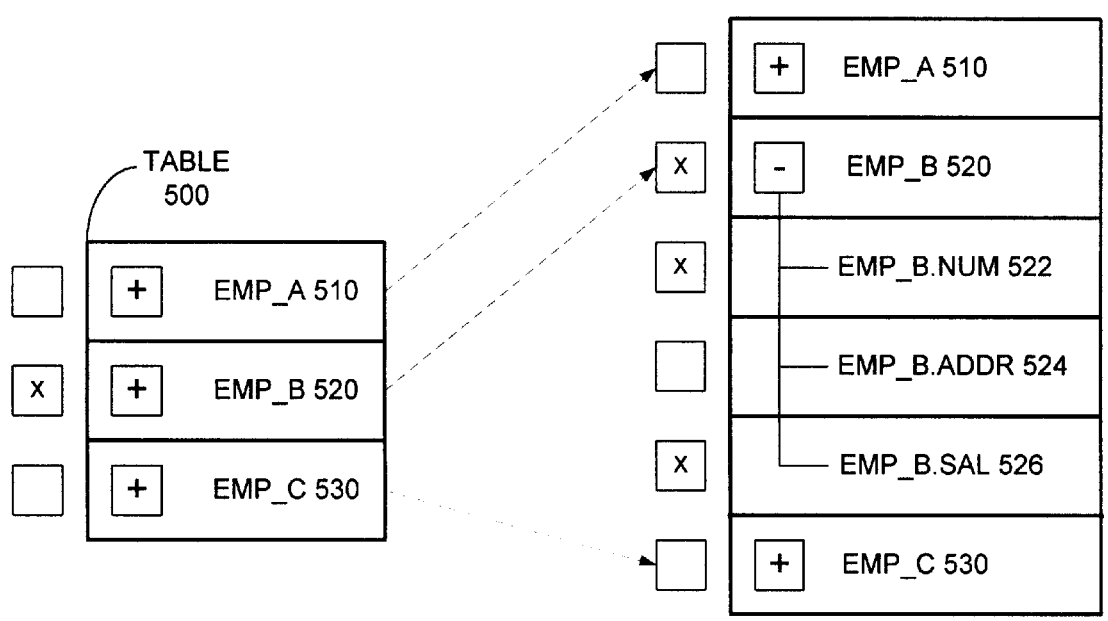
FIG. 5 illustrates how a graphical representation of an object entry in a table can be expanded in accordance with an embodiment of the present invention.

FIG. 5 illustrates how a graphical representation of an object in a table can be expanded in accordance with an embodiment of the present invention. The graphical representation illustrated in FIG. 5 includes a table 500, which includes a number of entries including, employee_A 510, employee_B 520 and employee_C 520. These entries are objects containing data for employees of a company. As is illustrated in FIG. 5, user interface 202 (from FIG. 2) allows a user to select a table entry, such as employee_B 520, using a pointing device, such as a computer mouse. When the entry is selected, the system retrieves the attributes for the object from the database and displays an expanded representation of the entry including the attributes. In the illustrated example, employee B_520 is expanded into its three constituent attributes, employee_B.number 522. employee_B.address 522 and employee_B.salary 524.

Note that an attribute may itself be an object or a reference to an object. If this is the case, the attribute can be selected by the user for further expansion, and the system will expand the object referred to by the attribute into its own attributes. This feature allows a user to navigate through an interconnected mesh of objects that refer to each other.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for displaying objects defined within an object-oriented programming system that are stored in a relational table structure, comprising:

displaying a first table of object-relational data, so that a first object in the first table is represented by an identifier for the first object;

receiving a command from a user to provide a more-detailed display of the first object;

wherein the command is received from the user through a mouse, which allows the user to move a cursor about a graphical user interface in order to select an entry in the first table to be displayed in more detail;

retrieving attributes of the first object from a data store;

displaying an expanded representation of the first object by displaying the attributes of the first object; and allowing the user to use the mouse to navigate into a second object nested within the first object by, receiving a command from the user through the mouse to provide a more-detailed display of an attribute from the attributes of the first object, and if the attribute represents the second object, retrieving attributes of the second object from the data store, and displaying an expanded representation of the second object by displaying the attributes of the second object.

2. The method of claim 1, wherein displaying the expanded representation of the first object includes displaying the expanded representation of all entries in the first table.

3. The method of claim 1, wherein retrieving the attributes of the first object from the data store includes retrieving the attributes of the first object from an object table, the object table containing a collection of objects which can be referenced from other tables.

4. The method of claim 1, wherein retrieving the attributes of the first object from the data store includes retrieving the attributes of the first object from the first table.

5. An apparatus for displaying objects defined within an object-oriented programming system that are stored in a relational table structure, comprising:

a computer system;

a display coupled to the computer system;

a mouse coupled to the computer system;

a user interface within the computer system that outputs a first table of object-relational data to the display, so that a first object in the first table is represented by an identifier for the first object;

a command receiving mechanism within the computer system that receives a command from a user to provide a more-detailed display of the first object;

wherein the command is received from the user through the mouse, which allows the user to move a cursor about a graphical user interface in order to select an entry in the first table to be displayed in more detail;

a data retrieval mechanism within the computer system that retrieves attributes of the first object from a data store; and an expanded display mechanism within the user interface that outputs an expanded representation of the first object to the display by displaying the attributes of the first object wherein the expanded display mechanism is configured to allow the user to use the mouse to navigate into a second object nested within the first object, wherein the expanded display mechanism is configured to, receive a command from the user through the mouse to provide a more-detailed display of an attribute from the attributes of the first object, and if the attribute represents the second object, to retrieve attributes of the second object from the data store, and display an expanded representation of the second object by displaying the attributes of the second object.

6. The apparatus of claim 5, wherein the expanded display mechanism is configured to display an expanded representation of all entries in the first table.

7. The apparatus of claim 5, wherein the attributes for the first object is located in an object table in the data store, the object table containing a collection of objects which can be referenced from other tables.

8. The apparatus of claim 5, wherein the attributes of the first object is located in the first table.

9. A program storage device storing instructions that when executed by a computer perform a method for displaying objects defined within an object-oriented programming system that are stored in a relational table structure, comprising:

- displaying a first table of object-relational data, so that a first object in the first table is represented by an identifier for the first object;
- receiving a command from a user to provide a more-detailed display of the first object;
- wherein the command is received from the user through a mouse, which allows the user to move a cursor about a graphical user interface in order to select an entry in the first table to be displayed in more detail;
- retrieving attributes of the first object from a data store;
- displaying an expanded representation of the first object by displaying the attributes of the first object; and
- allowing the user to use the mouse to navigate into a second object nested within the first object by,
  - receiving a command from the user through the mouse to provide a more-detailed display of an attribute from the attributes of the first object, and
  - if the attribute represents the second object, retrieving the attributes of the second object from the data store, and displaying an expanded representation of the second object by displaying the attributes of the second object.

\* \* \* \* \*